United States Patent Office 3,645,874
Patented Feb. 29, 1972

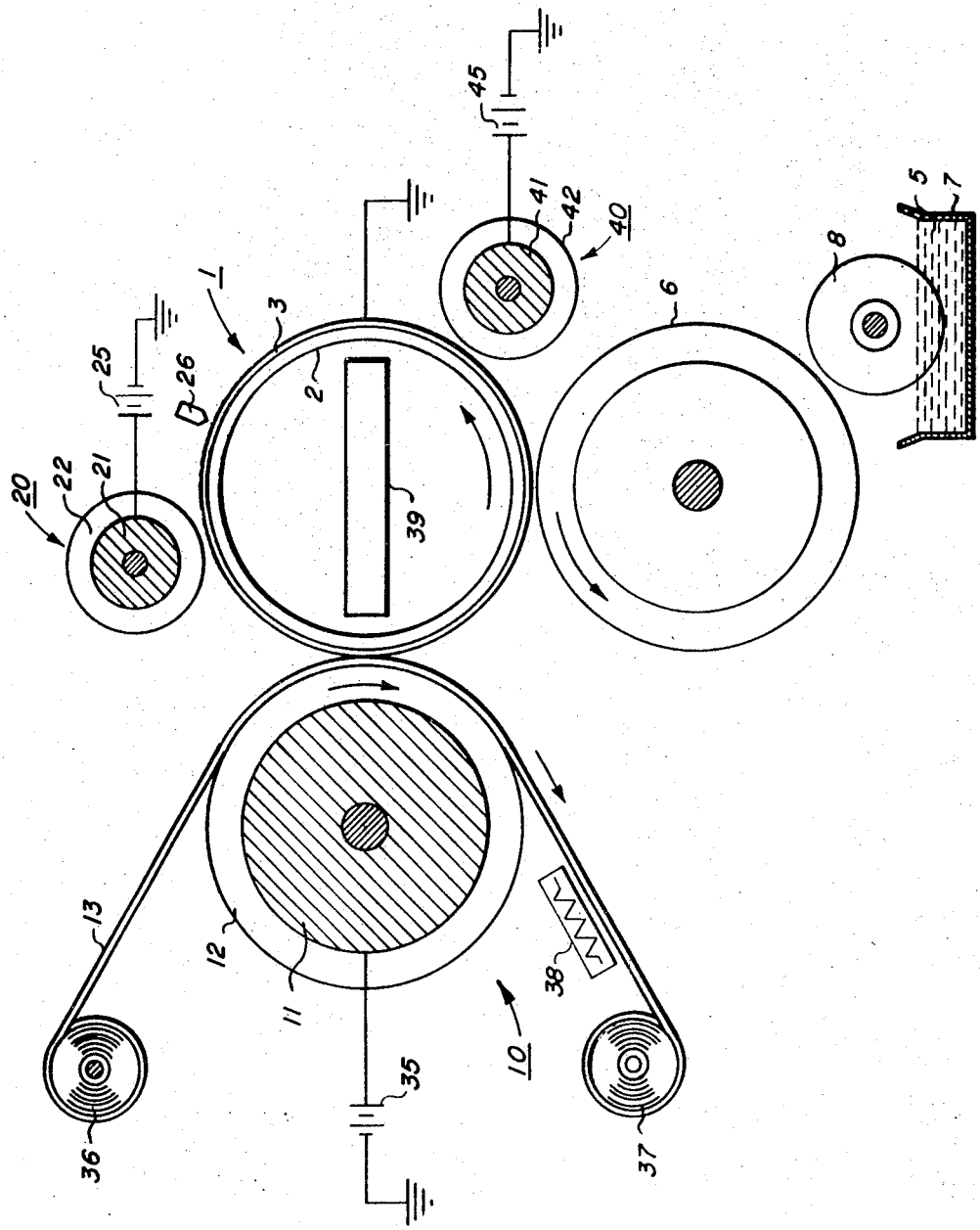

3,645,874
IMAGE DENSITY CONTROL IN PHOTOELECTRO-
PHORETIC IMAGING
John B. Wells, Rochester, N.Y., assignor to Xerox
Corporation, Rochester, N.Y.
Filed Oct. 3, 1969, Ser. No. 863,506
Int. Cl. B01k 5/00
U.S. Cl. 204—181                                    5 Claims

ABSTRACT OF THE DISCLOSURE

A photoelectrophoretic imaging system is disclosed whereby the density of the image produced at high speeds is increased by the introduction of a "density control" electrode.

BACKGROUND OF THE INVENTION

This invention relates to an imaging system and more specifically to an electrophoretic imaging system.

In photoelectrophoretic imaging colored photosensitive particles are suspended in an insulating carrier liquid. This suspension is then placed between at least two electrodes subjected to a potential difference and exposed to a light image. Ordinarily, in carrying out the process the imaging suspension is placed on a transparent electrically conductive support in the form of a thin film and exposure is made through the transparent support while a second generally cylindrically shaped biased electrode is rolled across this suspension. The particles are believed to bear an initial charge once suspended in the liquid carrier which causes them to be attracted to the transparent base electrode and upon exposure, to change polarity by exchanging charge with the base electrode so that the exposed particles migrate to the second or imaging electrode thereby forming images on each of the electrodes, by particle subtraction, each image being complementary one to the other. The process may be used to produce both polychromatic and monochromatic images. In the latter instance a single color photoresponsive particle may be used in the suspension or a number of differently colored photoresponsive particles may be used all of which respond to the light to which the suspension is exposed. An extensive and detailed description of the photoelectrophoretic imaging techniques as generally referred to may be found in U.S. Pats. Nos. 3,383,- 993, 3,384,488, 3,384,565, and 3,384,566, and are hereby incorporated by reference.

In the case of the polychromatic imaging process the imaging suspension will contain a plurality of at least two differently colored finely divided particles in the carrier liquid each of said particles comprising an electrically photosensitive pigment whose principal light absorption band substantially coincides with its principal photosensitive response. Thus, the pigment represents both the primary electrically photosensitive ingredient and the primary colorant for the specific particle in suspension. The particles utilized in the polychromatic system preferably have intense pure colors and are highly photosensitive. When the suspension is exposed to a multicolored image, particles will migrate to one electrode in proportion to the intensity of the light which they absorb. Thus, upon exposure, particles selectively remain on one of the electrodes in image configuration with complementary particles migrating to the other of the electrodes in this system. For example, when a mixture comprising cyan, magenta and yellow particles is exposed to an image whereby yellow light impinges the imaging suspension, the cyan and magenta particles will migrate leaving behind an image made up of the yellow pigment particles. Similarly, when exposed to a multicolored image different colored particles absorb light of their complementary color in the appropriate image areas and migrate thereby leaving a full colored image behind corresponding to the original.

Although the above described imaging systems have been found highly satisfactory for producing acceptable images one of the more troublesome problems encountered is to obtain high quality images with low background while maintaining the density of the resulting images sufficiently high to produce the necessary image contrast. In both monochrome and polychrome duplicating processes in order to reduce background at the operating speed of the duplicator a film-splitting roller has been introduced into the system which generally provides an adequate control to reduce the background level. However, in order to achieve the results desired at the operating speeds of the duplicator it is necessary to control the amount of ink flow (photosensitizing particles) presented for imaging. This requirement in effect limits the concentration of the electrophoretic pigment particles present in the imaging suspension at the imaging zone thus reducing the ultimate density of the resulting image.

SUMMARY OF THE INVENTION

It is, therefore, an object of this invention to provide an electrophoretic imaging system which will overcome the above noted disadvantages.

It is a further object of this invention to provide an electrophoretic imaging process capable of producing high quality, dense images.

It is another object of this invention to provide a novel electrophoretic imaging process.

Yet still a further object of this invention is to provide a novel electrophoretic imaging apparatus.

It is still a further object of this invention to provide a high contrast imaging system.

The foregoing objects and others are accomplished in accordance with the present invention, generally speaking by providing an imaging suspension comprising colored photoelectrophoretic imaging particles in an insulating carrier liquid. The imaging suspension of the present invention is interpositioned between at least two electrodes one of which is generally substantially transparent, subjected to a potential difference and selectively exposed to a reproducible image by a source of activating electromagnetic radiation. The imaging suspension is generally coated on the surface of a first transparent electrode in the form of a thin film and the exposure made through the transparent electrode generally during the period of contact with a second or imaging electrode. Prior to image exposure, the coated layer of imaging suspension is first subjected to an electric field generated by a potential generally below the corona threshold of the film. The effect of this field is to control the quantity of particles present in the suspension so as to, in effect, increase the concentration of the particles in the suspension for a given film thickness and to thereby maximize the density of the resulting image without affecting in a detrimental manner the other desirable operating characteristics of the system such as the operating speed. Following exposure to this density control electrode the film of imaging suspension is subjected to a second electric field by way of still another electrode at a potential generally above the corona threshold of the film thereby establishing the necessary corona discharge current which splits or otherwise separates the imaging suspension into two layers wherein the photoelectrophoretic pigment particles are effectively rendered unipolar and are substantially concentrated in a uniform manner on the surface of the transparent electrode. Thus, the effect of the second field and resulting current applied is to cause an electrophoretic deposition of the imaging particles in the form of a uniform film on the respective electrode thereby creating in essence of a two-layered film consisting of unipolar particles and vehicle, respectively. The photomigratory particles present in the suspension next respond to the exposure radiation in the imaging zone to form a visible image pattern at one or both of the electrodes, the images being complementary in nature. The imaging suspension employs intensely colored pigment particles which serve both as the colorant and as the photosensitive material. Additional photosensitive elements or materials are not required thus providing a very expedient imaging process. The particles respond to light in the regions of the spectrum of the principal absorption band with, for example, cyan, magenta and yellow particles responding to red, green and blue light, respectively. Thus, if a specific pigment is impinged by white light then it can be expected to respond to produce an image.

It has been determined that upon subjecting the imaging suspension of the present invention to an electric field of sufficient magnitude prior to the imagewise exposure of the suspension that the concentration of the pigment particles in the suspension may be so controlled that at high speeds a sufficient amount of the photoconductive pigment particles are present in the imaging film layer so as to produce high density images. The effect of the field is to increase the density of the suspension beyond that which would normally be attained by coating the electrode surface in a conventional manner. When used in the course of the present invention the expression "corona threshold potential or voltage" refers to that voltage at which air ionization occurs in the air gap between the particular liquid film and the respective electrode surface.

DETAILED DESCRIPTION OF THE INVENTION

The invention is further illustrated in the accompanying drawing in which there is seen a continuous electrophoretic duplicator comprising a transparent injecting electrode 1, imaging electrode 10, a film-splitting electrode 20 and an image density control electrode 40. The transparent electrode 1, in the instant illustration, is represented as consisting of a layer of optically transparent glass 2 overcoated with a thin optically transparent layer of tin oxide 3. Tin oxide coated glass of this nature is commercially available under the trade name "NESA" glass. A uniform layer of the imaging suspension 5 of the present invention is coated on the surface of the transparent electrode by an applicator 6 of any suitable design or material, such as a urethane sponge coated cylinder, which may rotate in the same direction as the transparent cylinder, or, as herein represented, in the opposing direction to the transparent cylinder. The function of the ink applicator is to apply the imaging suspension 5 from ink sump 7 by way of roller 8 to the transparent cylinder. In close proximity to the transparent roller electrode 1 is a second rotary electrode 10 having a conductive central core 11 which is covered with a layer 12 of material capable of blocking D.C. current, such as polyurethane, which will be referred to as a blocking layer. Although a blocking layer need not necessarily be used in the system, the use of such a layer is preferred because of the markedly improved results which it is capable of producing. A detailed description of the improved results and the types of materials which may be employed as the blocking layer may be found in U.S. Pat. No. 3,383,993.

The imaging suspension will consist of a dispersion of specifically colored, finely divided photosensitive particles in an insulating carrier liquid or vehicle. Any suitable differently colored photosensitive pigment particles may be used such as disclosed in U.S. Pats. Nos. 3,384,565 and 3,384,566. When the system is to be used in its preferred mode in conjunction with monochromatic photoelectrophoretic imaging then the imaging suspension will contain a plurality of pigment particles in a carrier liquid the pigment portion of which provides both the photosensitivity and colorant property for the particles. In the case of a polychrome system the suspension will contain a plurality of at least two differently colored particles having similar properties to those used in the monochrome process. If desirable a polychrome image may be prepared according to monochrome imaging in registration utilizing the proper color separation negatives as disclosed in U.S. patent application Ser. No. 812,796, filed Apr. 2, 1969 having a common assignee, or the input may be in the form of a Kodacolor negative. In an alternate embodiment, the suspension may be coated on the imaging electrode as depicted in U.S. Pat. No. 3,427,242, with the appropriate biasing electrodes added, whereby the color image is produced by a back migration of the image particles to the surface of the transparent roller electrode. Although not preferred the latter alternate embodiment demonstrates the flexibility of the system. The imaging suspension may also contain a sensitizer and/or binder for the pigment particles. The percentage of pigment in the carrier is not considered critical; however, for reference purposes it is noted that from about 2 to 10 percent pigment by weight has been formed to produce acceptable results.

A receiver sheet 13 is driven between cylinders 1 and 10 as represented, with an ink image selectively deposited on the receiver sheet in the imaging zone. A reverse image pattern is formed on the NESA glass cylinder which is removed at the ink application station. Thus, the applicator performs both the ink application and residual image removal steps.

Situated in close proximity to the applicator roll is a third electrode generally designated 40 and hereinafter referred to as the density control roller. Roller 40 consists of a conductive central core 41 covered with a layer of a dielectric material 42. Any suitable dielectric material may be used. Typical dielectric materials include elastomeric materials such as polyurethane elastomer (Disogrin Industries); silicone rubber RTV (General Electric Co.); Neoprene, a type of elastomer based on polymers of 2-chlorobutadiene-1,3; fluorelastomers such as Dow Corning's fluorosilicone elastomers and Viton available from DuPont; natural and vulcanized rubbers; polyvinylfluoride plastics such as Tedlar (Du Pont) and KYNAR (Pennsalt Corp.); polyester plastics such as polyurethane (Witco Co.); acrylonitrile polymers such as Hylar (B.F. Goodrich); mixtures and copolymers thereof.

As the film of the imaging suspension 5 passes beneath the density roller 40 a potential is applied to roller 40 by source 45. The effect of the resulting field established across the suspension is to cause an electrophoretic separation of the photoconductive particles from the liquid onto the transparent electrode producing a dense coating for further processing without effecting total film thickness. In this manner the optical density of the ink film applied may be effectively controlled so as to ultimately produce the maximum image density. The density of the ink film may be continuously monitored such as by a photoelectric means consisting of a lamp and photocell (not shown) and a signal fed to a control which regulates the potential on the biased density roller in a manner which maintains the concentration of pigment in the suspension relatively constant and at the desired level. The density roller may also serve to regulate the film thickness by its mechanical spacing and pressure so as to maintain the ink film thickness uniform in a manner compatible with the operating speed of the system. Thus the density roller may serve a twofold purpose that of increasing and maintaining uniform maximum print density as well as uniform film thicknesses. In addition, a metering device as represented by means 26 may be utilized in conjunction with the density roller so as to assure the proper film thickness for corresponding operating speeds.

The polarity of the potential applied to the density roller may be adjusted depending upon the polarity of the particles dispersed in the imaging suspension. The magnitude of the voltage will generally be less than the corona threshold for the air gap between the liquid film and roller. Sufficient voltage is applied so as to electrophoretically deposit the particles in the suspension on the surface of the transparent electrode 1 thereby increasing the concentration of pigment in the suspension to a degree substantially greater than that which ordinarily would be present in the absence of the applied field. The end effect on the density of the suspension will depend upon the magnitude of the potential applied to the roller and the controlled film thickness. Voltages effectively applied in the course of the present invention at film thicknesses of up to about 10 microns were generally less than 2500 volts. As stated above, the polarity of the potential applied to the density roller will generally be determined by the particular pigment particles dispersed in the carrier liquid and need not necessarily be the same polarity of the potential applied to the film-splitting roller further discussed below. Due to the presence of the density control roller in the system it is now possible to produce images at a rate much more rapidly than heretonow thought possible. However, imaging speeds as high as 155 i.p.s. have been achieved. High quality images have been obtained obtained at speeds of up to 40 to 50 i.p.s.

Located in close proximity to the area of contact of the transparent and imaging electrodes is still a fourth electrode generally designated 20 consisting of a conductive centrally core 21 covered with a layer of dielectric material 22. The dielectric materials utilized here are similar to those referred to above with respect to electrode 40. This electrode is generally referred to as the film-splitting electrode. As the film of imaging suspension 5 coated on the surface of the transparent electrode 1 passes beneath the film-splitting electrode 20, a D.C. potential is applied to the latter electrode by potential source 25. The effect of the resulting field and established corona current across the air gap and the imaging suspension is to charge substantially all the photosensitive particles present in the imaging suspension to the polarity of the charging roller and, in addition, to concentrate the particles at the surface of the transparent electrode by electrophoretic migration. Thus, a layer of highly concentrated, unipolar pigment is deposited on the imaging electrode with a layer of relatively clear liquid above it.

When this layered suspension enters the imaging zone at the area of contact of the transparent electrode 1 with the imaging electrode 10 the layer contacting the potential image support surface, whether it be the electrode surface itself or a sheet-like web position between the electrode surfaces as herein represented, will be substantially free of pigment particles thereby minimizing the possibility of contaminating the image support suruface. A means 26 for metering the ink flow passing between the film-splitting electrode and the transparent electrode may be included in the system to provide a backup system for the metering effect of the density electrode. Control of the ink film thickness is necessary to eliminate ink flooding which tends to suppress corona and thereby nullify the effect of the corona current upon the imaging suspension generated at the film-splitting electrode.

The potential applied to the film-splitting electrode is generally maintained at a value above the corona threshold potential for the air gap between the liquid film 5 and roller 20. The primary concern is that sufficient D.C. corona current be generated to cause the particles in the suspension to become unipolar and to establish the two-layered film. Voltages effectively applied in the course of the present invention at film thicknesses of about 1 to 2 microns are generally greater than 2500 volts. At ink film thicknesses greater than 2 microns corona threshold is generally found to be somewhat greater than 3500 volts. For maximum assurance that the desired effect is realized preferred voltages are in the range of from about 5000 to 8000 volts. The polarity of the potential applied to the film-splitting roller is generally maintained at the same sense as that applied to the imaging electrode 10.

The layered suspension enters the imaging zone between the transparent and imaging electrodes with the vehicle being the outermost layer. An image is projected into the nip of the rollers by way of a first surface mirror designated 39. A field is established across the imaging zone with the potential being supplied by power source 35. Through the entire operation the NESA glass transparent roller electrode is connected to ground. If desirable the ground connection may be eliminated and a bias applied to the NESA electrode. A receiver sheet 13 represented in the form of a paper web is fed from supply roll 36 and passes between the glass injecting electrode and the imaging electrode and is rewound on take up roller 37. Fixing of the image developed on the surface of the copy web 13 may be accelerated by the presence of heating unit 38 which assists in vaporizing the carrier component remaining in combination with the colored pigment particles.

Although the film-splitting roller may be positioned generally at any point between where the imaging suspension is coated on the transparent electrode and the imaging zone it is preferred that the film-splitting roller be located as close as possible to the area of contact between the imaging roller and the transparent injecting electrode so as to decrease the time for dark discharge of the unipolar particles to occur prior to imaging.

Any suitable insulating carrier liquid may be used in the course of the present invention. Typical vehicles include decane, dodecane, tetradecane, molten paraffin wax, molten beeswax and other molten thermoplastic materials, Sohio Odorless Solvent a kerosene fraction available from Standard Oil Company of Ohio, Isopar G a branched chain saturated aliphatic hydrocarbon mixture available from Humble Oil Company of New Jersey, olive oil, mineral oil, linseed oil, cottonseed oil, marine oils such as sperm oil and cod liver oil, silicone oil such as dimethyl polysiloxane (Dow Corning Co.), castor oil, corn oil, peanut oil, fluorinated hydrocarbons such as Freon (Du Pont) and compatible mixtures thereof.

A wide range of voltages may be applied between the electrodes in the system at which imaging occurs. In the case of the field established across the imaging suspension in the imaging zone it is preferred in order to obtain good image resolution and density that the field across the imaging suspension be at least 5 volts/micron and preferably about 20 volts/micron or more such as to create an electric field of at least about 300 volts. The applied potential necessary to obtain the field of strength will, of course, vary depending upon the interelectrode gap and upon the thickness and type of blocking material used on the respective imaging electrode surface. The preferred voltages normally exceed the corona threshold at about 3500 volts in order to maintain the desired layering effect created by roller electrode 20 and to obviate premature dark discharge and background migration of the particles. Voltages as high as 8000 volts have been applied to produce images of high quality. The upper limit of the field strength is limited only by the breakdown potential of the suspension and blocking material.

Imaging as carried out in conjunction with the process of the present invention will generally be in a negative to positive or positive to negative imaging mode. Thus, for purposes of the present discussion, in order to produce the positive image on the receiver sheet a negative image is projected into the nip of the imaging and transparent electrodes. As discussed above a potential is applied across the imaging suspension. The pigment particles migrate upon exposure to the actinic radiation through the carrier to the surface of the imaging roller or, in the instance of the above described illustration, to the surface of the intervening receiver paper sheet. The pigment image formed may be fixed in situ by placing a lamination over its surface or by solvent removal aided by the application of heat or if desired the image may be transferred to a secondary substrate to which it is in turn fixed. The system herein described produces a high density image with little or no background.

Although represented as being formed on the surface of an intervening receiver sheet, the pigment image may be formed on the surface of a removable blocking layer or a transfer paper sleeve wrapped about the blocking electrode. In either instance the sleeve of paper material or the blocking layer will pick up the complete image and need only be removed to produce the final usable copy. All that is required is to replace the removable material with a similar material. In the present configuration images are produced directly on a paper receiver sheet or other substrate with the image formed on the NESA or transparent cylinder removed by the action of the ink applicator. However, if desired the image formed on the NESA cylinder need not be discarded but may be utilized by offsetting the image from the NESA cylinder onto the surface of a conventional receiving sheet such as described above. If the image is formed on a permanent electrode surface it will be found preferable to transfer the image from the electrode and fix it on a secondary substrate so that the electrode may be reused. Such a transfer step may be carried out by any suitable technique such as adhesive pick off techniques or preferably by electrostatic field transfer. Any suitable material may be used as the receiving substrate for the image produced such as paper as represented in the illustration or other desirable substrates. For example, if one desires to prepare a transparency the use of polyethylene terephthalate or cellulose acetate might be desirable.

It is to be understood that it is not intended that the structural arrangement of the apparatus represented by the illustration be restricted to the design as set out herein and all similar configurations which will satisfy the requirements of the present invention are contemplated. For example, although the imaging electrode or roller is represented as a cylinder it may also take the form of a flat plate electrode as may the injecting or NESA electrode. Furthermore, depending upon the specific configuration of the electrodes and other related aspects of the system either electrode which participates in the direct imaging step could be optically transparent and exposure made through it.

When used in the course of the present invention the term injecting electrode should be understood to mean that it is an electrode which will preferably be capable of exchanging charge with the photosensitive particles of the imaging suspension when the suspension is exposed to light so as to allow for a net change in the charge polarity on the particle. By the term blocking electrode or layer is meant one which is substantially incapable of injecting charge carriers into the photosensitive particles when the particles come into contact with the surface of the respective electrode thereby eliminating particle oscillation in the system.

It is preferred that the injecting electrode be composed of an optically transparent material, such as glass, overcoated with a conductive material such as tin oxide, copper, copper iodide, gold or the like; however, other suitable materials including many semiconductive materials such as a cellophane film, which are ordinarily not thought of as being conductors but which are still capable of accepting injected charge carriers of the proper polarity from the imaging particles under the influence of an applied electric field may be used within the course of the present invention. The use of more conductive materials allows for cleaner charge separation and prevents possible charge buildup on the electrode. The blocking layer of the imaging electrode, on the other hand, is selected so as to prevent or greatly retard the injection of electrons into the photosensitive pigment particles when the particles reach the surface of this electrode. The core of the blocking or imaging electrode generally will consist of a material which is fairly high in electrical conductivity. Typical conductive materials including conductive rubber, and metal foils of steel, aluminum, copper and brass have been found suitable. Preferably, the core of the electrode will have a high electrical conductivity in order to establish the required field differential in the system; however, if a material having a low conductivity is used a separate electrical connection may be made to the back of the blocking layer of the blocking electrode. For example, the blocking layer or sleeve may be a semiconductive polyurethane material having a conductivity of from about $10^{-8}$ to $10^{-9}$ ohm-cm. If a hard rubber non-conductive core is used then a metal foil may be used as a backing for the blocking sleeve. Although a blocking layer need not necessarily be used in the system, the use of such a layer is preferred because of the markedly improved results which it is capable of producing. It is preferred that the blocking layer, when used, be either an insulator or a semi-conductor which will not allow for the passage of sufficient charge carriers, under the influence of the applied field, to discharge the particles finely bound to its surface thereby preventing particle oscillation in the system. The result is enhanced image density and resolution. Even if the blocking layer does allow for the passage of some charge carriers to the photosensitive particles it still will be considered to fall within the class of preferred materials if it does not allow for the passage of sufficient charge so as to recharge the particles to the opposite polarity. Exemplary of the preferred blocking materials used are baryta paper, Tedlar (a polyvinylfluoride), Mylar (polyethylene terephthalate) and polyurethane. Any other suitable material having a resistivity of from about $10^7$ ohm-cm. or greater may be employed. Typical materials in this resistivity range include cellulose acetate coated papers, cellophane, polystyrene and polytetrafluoroethylene. Other materials that may be used in the injecting and blocking electrodes and other photosensitive particles which can be used as the photomigratory pigments and the various conditions under which the system operates may be found in the above cited issued patents U.S. Pats. Nos. 3,3844,565 and 3,384,566 as well as U.S. Pats. Nos. 3,384,488 and 3,383,993.

It is to be understood that any suitable photosensitive pigment particle as identified in the above cited patents may be employed within the course of the present invention with the selection depending largely upon the photosensitivity and the spectral sensitivity required. Typical photoresponsive materials include substituted and unsubstituted organic pigments such as phthalocyanines, for example Monarch Blue G, beta form of copper phthalocyanine available from Hercules, Inc., quinacridones as for example Monastral Red B available from du Pont, Algol Yellow (1,2,5,6-di(C,C'-diphenyl)-diazoanthraquinone) (C.I. 67300), Irgazine Red, tri-sodium salt of 2-carboxyl phenyl azo(2-naphthiol-3,6-disulfonic acid) (C.I. 16105), 3-benzylidene aminocarbazole, 3-aminocarbazole, Watchung Red B (1-4'-methyl-5'-chloroazobenzene-2'-sulfonic acid-2-hydroxy-3-naphthoic acid) (C.I. 15865), a yellow pigment identified as Yellow 96 comprising N-2''-pyridyl-8,13-dioxodinaphtho-(2,1-b; 2',3'-d)-furan-6-carboxamide, and inorganic pigments such as zinc oxide, cadmium sulfide, cadmium selenide, selenium, antimony sulfide, arsenic sulfide, and mixtures thereof. The imaging suspension may contain one or more different photosensitive particles having various ranges of spectral response.

PREFERRED EMBODIMENTS

To further define the specifics of the present invention the following examples are intended to illustrate and not limit the particulars of the present system. Parts and percentages are by weight unless otherwise indicated.

In the following examples the NESA electrode consists of a 6 inch diameter Pyrex glass cylinder concentric to about 0.001 inch with a conductive tin oxide coating. The imaging or blocking electrode consists of a 4 inch diameter conductive steel core with a ¼ inch thick layer of polyurethane forming the blocking layer. Both the film-splitting (background control) and density control electrodes consist of a ½ inch diameter aluminum core covered with a ¼ inch layer of polyurethane.

EXAMPLE I

A cyan ink suspension consisting of 4.0 grams x-phthalocyanine, 2.0 grams tricresyl phosphate (TCP), .05 gram beta carotene and about 160 cc. sperm oil is supplied to a tin oxide coated glass cylinder from a urethane sponge. The film of imaging suspension is metered to a thickness of about 3 microns as it passes beneath the density control electrode and a potential of about −1000 volts is applied. As the film passes the nip between the film-splitting roller and the NESA electrode a potential of about +7000 volts is applied across the imaging suspension. As the imaging suspension proceeds to the nip between the NESA and imaging electrodes a negative image is projected into the imaging zone. A potential of about +8000 volts is developed across the imaging suspension during exposure. The speed of the imaging roller is maintained at about 6 inches/second (i.p.s.). A 500 watt quartz iodine light source illuminates the film negative. The light passes through an optical system and is projected into the nip by way of a first surface mirror. Cyan pigment particles are selectively deposited onto a paper receiver sheet in the imaging zone. The x-phthalocyanine is prepared according to the process set out in U.S. Pat. No. 3,357,989, issued Dec. 12, 1967, having a common assignee. High quality background free images are obtained with a background density of about 0.01 and a print density of about 1.3. In a control experiment eliminating the density control electrode, at the above speed, the print density is about 0.5 with background about the same.

EXAMPLE II

The process of Example I is repeated with the exception that the imaging suspension consists of a magenta ink suspension consisting of 8.0 grams Monastral Violet, 2.0 grams of TCP, .05 gram of beta carotene and 106 cc. sperm oil. The film is coated to a thickness of about 4 microns. The potential applied to the film-splitting roller is about +8000 volts and that applied to the density control roller is about +1500 volts. Imaging speed is 12 inches/second. A magenta image is formed on the surface of the paper receiver sheet which passes between the nip of the NESA and imaging electrodes. The background density measures 0.08 and print density 1.2. The Monastral Violet is commercially available from E. I. du Pont de Nemours & Co. In a control experiment with no voltage applied to the density control electrode print density measured about 0.5 with the background remaining about the same.

EXAMPLE III

The process of Example I is repeated with the exception that a yellow ink suspension comprising 20 grams Shepherd Golden Yellow No. 55, 2 grams TCP, .05 gram beta carotene and 106 cc. Sohio brand kerosene is substituted for the cyan imaging suspension. The yellow pigment is commercially available from the Shepherd Chemical Company. Both the film-splitting and imaging rollers are operated at −6500 v. Imaging speed is about 45 inches/second. The density control roller is operated at −1000 v. A high quality, low background yellow image is obtained having a background density of .02 and blue-light print density of 1.0. With the potential of the density control roller reduced to zero the density is observed to drop off to 0.6. Background is not appreciably affected.

EXAMPLE IV

The process of Example I is repeated with the exception that a tri-mix imaging suspension is utilized in place of the cyan suspension. The tri-mix suspension consists of equal amounts of Watchung Red B, a barium salt of 1-(4'-methyl-5'-chloro-2'-sulfonic acid) azobenzene-2-hydroxy-3-naphthoic acid, C.I. No. 15865, Monolite Fast Blue GS, a mixture of alpha and beta metal free phthalocyanine, available from Arnold Hoffman Co., C.I. No. 74100 and a proprietary yellow pigment N-2'-pyridyl-8,13-dioxodinaphtho-(211-b; 2',3'-d) furan - 6 - carboxamide, more fully defined in U.S. patent application Ser. No. 421,281, filed Dec. 28, 1964, having a common assignee now U.S. Pat. No. 3,447,922, in mineral oil with the total pigment constituting about 8% by weight of the imaging suspension. The input information is a Kodacolor negative. Imaging speed is 10 inches/second. A positive polychrome image is formed on the receiver sheet displaying a low background density of .03 and print density of 1.5. With the elimination of the density control roller print density drops to about 0.8.

Although the present examples were specific in terms of conditions and materials used, any of the above materials may be substituted when suitable with similar results being obtained. In addition to the steps used to carry out the process of the present invention other steps or modifications may be used if desirable. For example more than one density control electrode may be utilized. In addition, a polychrome image may be formed by first preparing color separation negatives of a color print and then utilizing the resulting color separation negatives to produce monochrome images of the corresponding colors in registration at three separate imaging stations. Alternatively, each image may be reproduced and transferred in registration or each image may be produced on a single transparent sheet and the resulting imaged sheets placed one on top of the other in registration to produce a transparent overlay for projecting purposes. In addition, other materials may be incorporated in the imaging suspension, various different voltages may be applied, film thicknesses utilized and the speed may be varied in a manner which will enhance, synergize or otherwise desirably affect the properties of the present system. For example, various sensitizers may be included in the imaging suspension which will enhance the final results.

Those skilled in the art will have other modifications occur to them based on the teachings of the present invention. These modifications are intended to be encompassed within the scope of this invention.

What is claimed is:
1. The method of photoelectrophoretic imaging which comprises:
   (a) providing a layer of a suspension of electrically photosensitive particles in an insulating carrier liquid on a first electrode,
   (b) contacting the free surface of said suspension with a first roller electrode while applying a first potential difference between said first roller electrode and said first electrode, said potential difference being below the corona threshold for the air gap between the liquid layer and the roller electrode but sufficient to electrophoretically deposit the particles on the surface of the first electrode; and subsequently,
   (c) contacting the free surface of said imaging suspension with a second roller electrode while applying a second potential difference of at least about 5,000 volts D.C. between said second roller electrode and said first electrode; and subsequently,
   (d) contacting said imaging suspension with an image receiving member while applying a third potential difference of at least about 3500 volts D.C. across said suspension and simultaneously exposing said suspension to a pattern of electromagnetic radiation to which at least a portion of said particles are responsive until an image is formed, wherein said second potential difference and said third potential difference are of the same polarity.
2. The method of claim 1 wherein said first potential difference is of a polarity opposite to the polarity of said second and said third potential differences.

3. The method of claim 1 wherein said first potential difference is of the same polarity as said second and said third potential differences.

4. The method of claim 1 wherein said particles comprise particles of more than one color and said particles of a first color having a spectral response which does not substantially overlap the spectral response of particles of a differing color.

5. The method of claim 1 wherein said first electrode is transparent and said suspension is exposed to said pattern of radiation through said first member.

References Cited
UNITED STATES PATENTS 3,384,565   5/1968   Tulagin et al. _____ 204—181

GEORGE F. LESMES, Primary Examiner

J. C. COOPER III, Assistant Examiner

U.S. Cl. X.R.

96—1 R, 1.2, 1.3